A. A. SCHROEDER.
FRICTION DRUM.
APPLICATION FILED FEB. 19, 1909.
946,988.
Patented Jan. 18, 1910.
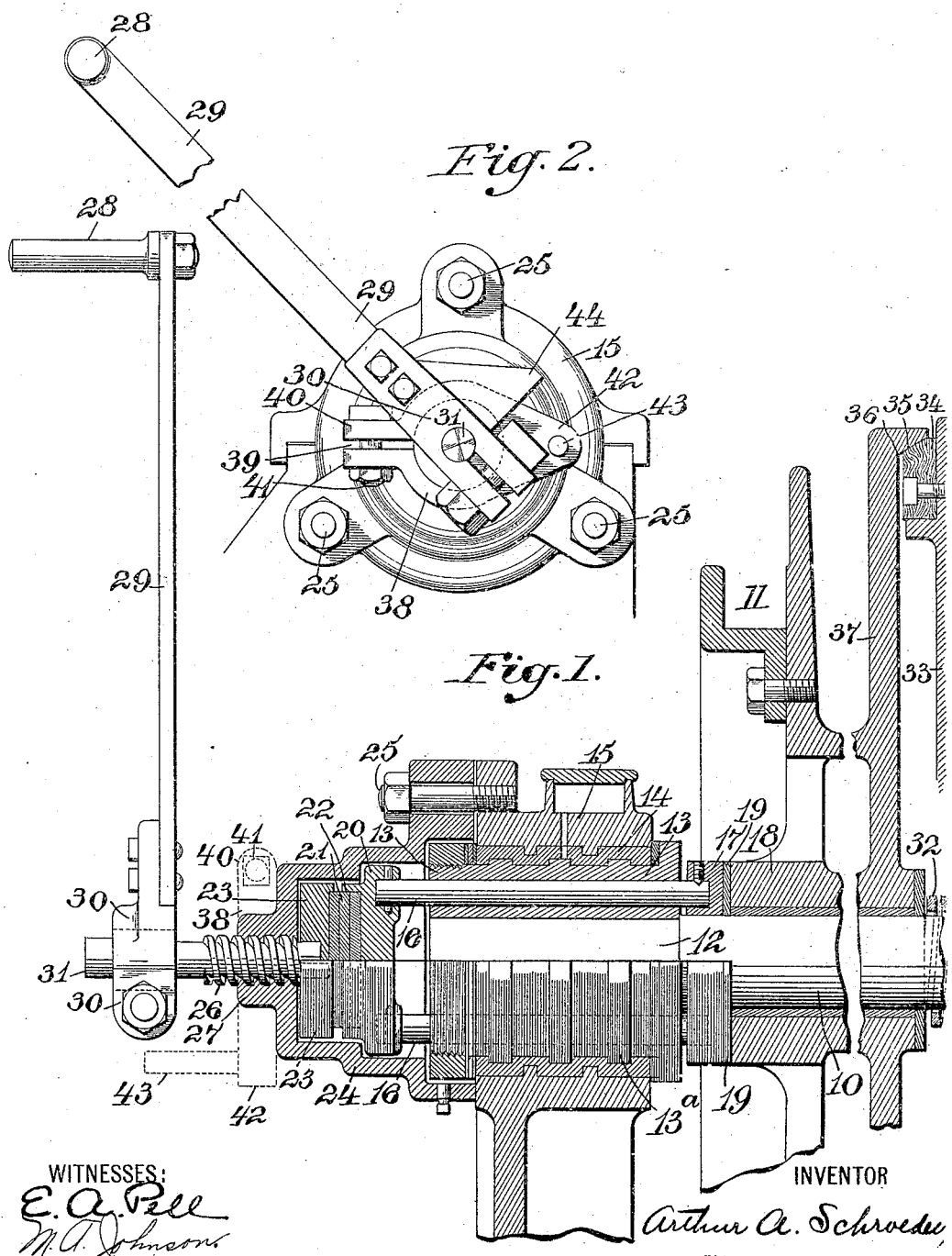

UNITED STATES PATENT OFFICE.

ARTHUR A. SCHROEDER, OF NEWARK, NEW JERSEY.

FRICTION-DRUM.

946,988.   Specification of Letters Patent.   Patented Jan. 18, 1910.

Application filed February 19, 1909. Serial No. 478,791.

*To all whom it may concern:*

Be it known that I, ARTHUR A. SCHROEDER, a citizen of the United States, residing at Newark, in the county of Essex and State of New Jersey, have invented certain new and useful Improvements in Friction-Drums; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention is designed to provide a hoisting drum and particularly a clutching mechanism whereby the drum is placed in operative connection with its shaft so as to rotate or to be released so that it runs freely thereon, and is designed to provide a clutch that is positive and at the same time simple.

The invention is further designed to provide a clutch that is so placed that it does not become dirty and grit does not interfere with its frictional parts, since there are no openings for the lodgment of any foreign material.

A still further object is to provide a clutch in which the end thrust is well taken care of and none of the parts are subjected to any undue strain.

Another object of the invention is to provide an adjustable stop which can be placed so as to limit the movement of the operating lever at certain points, and in this way the handle can be adapted to various operators who may prefer different points at which the operating lever is operative or at rest.

The invention is illustrated in the accompanying drawings, in which—

Figure 1 is a section of the clutch with portions of a drum shown broken away, and Fig. 2 is a view of the outside of the clutch showing the adjustable stop.

The shaft 10 of the drum 11 has its end 12 provided with a sleeve 13, which sleeve rotates with the shaft, revolving in the anti-friction metal 14 in the bearing on a standard 15 of the machine, the sleeve being provided with ribs 13ª which enter the anti-friction bearing to prevent longitudinal movement, these being supplemented by collars on the end of the sleeve. A pair of stems 16 are constructed so that they slide in the collar 13 and are provided, on one end, with the flange 17 which operates against a hub 18 on the drum, they having a washer 19 of anti-friction metal between them. These surfaces constitute the contacting members that force the drum longitudinally, as will be hereinafter described. The outer ends of the stems 16 are seated in a disk 20 which rotates with the stems and against the anti-friction plates 21 which are preferably seated in a recess 22 in the disk, and are also seated in a slight depression in the operating plate 23. The anti-friction plates, the operating plate and the disk are inclosed in a casing 24 which is secured by the bolts 25 to the bearing, and which forms an oil box so that the rotating and non-rotating parts, at their abutting points, contact on each other in oil so as to minimize the friction. The operating plate is thrust forward when the screw 26, which is seated in the hub 27 of the casing 24, is turned by the handle 28 which communicates, through the lever 29 and the clamping member 30, its motion to the shaft 31 on which the screw-thread 26 is arranged.

It will be seen that when the handle is in normal position, the screw-thread is retreated in the hub and the operating plate 23 is drawn back so that the rotating disk 20 is free to revolve with the collar 13 in the stem 16, all these turning with the shaft 12, and the drum 11 is stationary because it is not connected, positively, with the shaft. The other end of the drum operates against a spring 32 which abuts on another element in the machine to oppose the action of the clutch, this element preferably being a disk 33 which is fastened to the shaft as is customary in this class of machinery, and as will be understood by persons skilled in the art. The disk 33 has a ring 34 which is made of fiber or other suitable material, and has a beveled face 35 on which the beveled face 36 of the flange 37 of the drum 11 rides when the clutch is operated so that the disk 33, which is continuously operating, is then in frictional contact with the drum and the drum is rotated with the shaft. On operating the handle 28 to its normal position, the screw-thread 26 permits the spring 32 to act on the drum 11 and throw the beveled contacting faces 35 and 36 far enough apart to prevent the rotation of the drum. The rotating and the non-rotating parts, being in conjunction within an oil box formed by the casing 24, provide against their being filled with grit or dirt, and the parts therefore have longer life and are more easily operated. The flange 17 and the hub 18 are normally held together or against the washer 19 by the spring 32 and there is very little chance of any dirt settling between these parts to bear on the shaft, but what little dirt enters between them would not affect the operation, since the hub and the flange are both rotated together.

The engineers who operate this class of machinery have individual ideas as to the position of the operating lever in its normal position or in its operative position, some preferring to have it operated starting at the right and coming to a vertical position when operated, some preferring to have it vertical when inoperative and throwing it over to the left when it is operated, and to provide for this adjustment I place, on the hub, a spring collar 38 which is split at 39 to form the two wings 40 which are held together by a bolt 41. The collar 38 has a nose 42 from which projects a pin 43. A nose 44 is arranged on the lever of the handle or on the clamping member 30, this nose being adapted to engage the pin 43 to limit the movement of the lever in one direction, and that is preferably the return movement, so that by setting the clamping member 30 and the split collar 38, the handle can assume any position for its starting point.

Having thus described my invention, what I claim is:—

1. The combination of a hoisting drum, a shaft on which it is loosely mounted, an element connected to the shaft with which the hoisting drum is adapted to coöperate to form a friction clutch, of a sleeve on the shaft and rotatable therewith, stems in the sleeve, a flange on the end of the stem and bearing on the drum, a disk bearing on the outer end of the stems, an operating plate adapted to be moved longitudinally of the shaft and against the disk, and manually operated means for actuating the operating plate.

2. The combination of a hoisting drum, a shaft on which it is loosely mounted, an element connected to the shaft with which the hoisting drum is adapted to coöperate to form a friction clutch, of a sleeve on the shaft and rotatable therewith, stems in the sleeve, a flange on the end of the stem and bearing on the drum, a disk bearing on the outer end of the stems, an operating plate adapted to be moved longitudinally of the shaft and against the disk, manually operated means for actuating the operating plate, and an adjustable stop for limiting the return movement of the operating means.

3. A clutch for a hoisting drum comprising a shaft, a bearing, a sleeve mounted in the bearing and on the shaft and adapted to rotate with the shaft, stems passing longitudinally through the sleeve, a flange on one end of the stems to bear on a hoisting drum, a casing forming an oil chamber inclosing the ends of the sleeve and the ends of the stems, a disk connected to the stems, an operating plate, anti-friction plates between the operating plate and the disk, and means passing through the casing for forcing the operating plate.

4. A clutch for a hoisting drum comprising a shaft, a drum loosely mounted on the shaft, a bearing, a sleeve rotatably mounted in the bearing and secured to the shaft, stems arranged to slide in the sleeve, a flange on one end of the stems, the flange being adapted to bear on the drum, a casing secured to the bearing and forming an oil chamber, a disk on the outer ends of the stems, an operating plate, friction plates between the operating plate and the disk, a shaft bearing on the operating plate and being in screw-threaded connection with the casing, and a lever on the last mentioned shaft providing for its manual manipulation.

5. A clutch for a hoisting drum comprising a shaft, a drum loosely mounted on the shaft, a bearing, a sleeve rotatably mounted in the bearing and secured to the shaft, stems arranged to slide in the sleeve, a flange on one end of the stems, the flange being adapted to bear on the drum, a casing secured to the bearing and forming an oil chamber, a disk on the outer ends of the stems, an operating plate, friction plates between the operating plate and the disk, a shaft bearing on the operating plate and being in screw-threaded connection with the casing, a lever on the last mentioned shaft providing for its manual manipulation, and an adjustable stop to limit the return movement of the lever.

6. A clutch for a hoisting drum comprising a shaft, a drum loosely mounted on the shaft, a bearing, a sleeve rotatably mounted on the bearing and secured to the shaft, stems arranged to slide in the sleeve, a flange on one end of the stems, the flange being adapted to bear on the drum, a casing secured to the bearing and forming an oil chamber, a disk on the outer ends of the stems, an operating plate, friction plates between the operating plate and the disk, a shaft bearing on the operating plate and being in screw-threaded connection with the casing, a lever on the last mentioned shaft providing for its manual manipulation, a nose on the lever, a pin projecting in the path of the nose, and means for adjusting the pin annularly in its relation to the last mentioned shaft.

7. A clutch for a hoisting drum comprising a shaft, a drum loosely mounted on the shaft, a bearing, a sleeve rotatably mounted on the bearing and secured to the shaft, stems arranged to slide in the sleeve, a flange on one end of the stems, the flange being adapted to bear on the drum, a casing secured to the bearing and forming an oil chamber, a disk on the outer ends of the stems, an operating plate, friction plates between the operating plate and the disk, a shaft bearing on the operating plate and being in screw-threaded connection with the casing, a lever on the last mentioned shaft providing for its manual manipulation, a collar mounted on the casing, means for adjusting the collar rotatably on the casing and securing it thereto, a pin projecting from the collar, and a nose on the lever and arranged to abut on the pin when the lever is in its normal position.

In testimony, that I claim the foregoing, I have hereunto set my hand this 11th day of February 1909.

ARTHUR A. SCHROEDER.

Witnesses:
Wm. H. Camfield,
E. A. Pell.